United States Patent [19]
Ouchi et al.

[11] Patent Number: 4,872,373
[45] Date of Patent: Oct. 10, 1989

[54] DIFFERENTIAL CONTROL DEVICE

[75] Inventors: Mitsuyuki Ouchi; Koichi Aono, both of Susono, Japan

[73] Assignee: Toyota Jidosha Kabushiki Kaisha, Aichi, Japan

[21] Appl. No.: 111,264

[22] Filed: Oct. 22, 1987

[30] Foreign Application Priority Data

Oct. 24, 1986 [JP] Japan .................................. 61-252060

[51] Int. Cl.$^4$ ............................................. F16H 1/44
[52] U.S. Cl. ..................................... 74/711; 74/710.5; 74/866
[58] Field of Search ....................... 74/711, 710.5, 866, 74/710, 714, 715; 364/424.1; 180/248, 249

[56] References Cited

U.S. PATENT DOCUMENTS

| | | | |
|---|---|---|---|
| 4,218,938 | 8/1980 | Hattori ............................... | 74/710.5 |
| 4,523,494 | 6/1985 | Sparks et al. ..................... | 74/711 X |
| 4,559,599 | 12/1985 | Habu et al. ........................ | 364/424.1 |
| 4,570,509 | 2/1986 | Nighswonger ..................... | 74/710.5 |
| 4,645,045 | 2/1987 | Takefuta ............................ | 74/866 X |
| 4,679,463 | 7/1987 | Ozaki et al. ......................... | 74/710.5 |
| 4,681,180 | 7/1987 | Oyama et al. ..................... | 74/711 X |

FOREIGN PATENT DOCUMENTS

60-132928 9/1985 Japan .
61-67629 4/1986 Japan .
61-132420 6/1986 Japan .

Primary Examiner—Leslie A. Braun
Assistant Examiner—Christopher Campbell
Attorney, Agent, or Firm—Oliff & Berridge

[57] ABSTRACT

A differential control device for controlling the differential of a differential gear having a limited slip differential includes a sensor for detecting drive torque, a controller for receiving the detected torque from the sensor to compare the size of the torque with a predetermined value and an actuator. The actuator is controlled by the controller to operate the limited slip differential for limiting the differential when the detected torque exceeds the predetermined value.

14 Claims, 7 Drawing Sheets

DIFFERENTIAL CONTROL DEVICE

BACKGROUND OF THE INVENTION

1. Field of the Invention

This invention relates to a differential control device and, more particularly, to a device which controls the differential of a differential gear provided with a limited slip differential and installed on a vehicle.

2. Description of the Prior Art

A differential gear capable of limiting the differential is provided with a limited slip differential including a plurality of friction disks and a hydraulic device for operating these friction disks or the like, in addition to a usual differential mechanism, in order to limit the differential produced in the differential mechanism by the contact of the friction disks. Thus, when the travelling speed exceeds a predetermined value, the differential is limited to improve travelling stability (for example, Japanese Patent Public Disclosure (KOKAI) 237242/85), or the limitation of the differential is released according to the size of turning angle to improve both turning performance and travelling performance.

SUMMARY OF THE INVENTION

Though the tractive forces of tires need to be sufficiently ensured at the time of starting of a vehicle, acceleration with high speed, travelling on an uphill road and traction etc., any device for limiting the differential when the vehicle speed exceeds a predetermined value cannot obtain the necessary tractive forces.

An object of the present invention is to provide a differential control device for controlling a limited slip differential to ensure the tractive forces at the time of starting, acceleration with high speed, travelling on an uphill road and traction and so on.

According to the present invention, there is provided a device for controlling the differential of a differential gear having a limited slip differential, which comprises means for detecting drive torque, a controller for receiving a signal from said means to compare the size of the signal with a predetermined value and means controlled by a signal from said controller to operate said limited slip differential so as to limit the differential when the drive torque exceeds the predetermined value.

According to the present invention, there is also provided a device for controlling the differential of a differential gear having a limited slip differential, which comprises means for detecting a drive torque condition, a controller for obtaining torque based on a signal from said means and comparing the obtained torque with a predetermined value and means controlled by a signal from said controller to operate said limited slip differential so as to limit the differential when the obtained torque exceeds the predetermined value.

The controller compares the torque with a predetermined value and, when the torque exceeds the predetermined value, operates the operating means to limit the differential. Thus, the differential between left and right tires is limited so that large torque may be given to the tires. Further, when attaching much importance to the turning performance, the controller, for example, handles a steering angle in preference to the torque and releases the limitation of the differential when the steering angle exceeds a predetermined value.

Since the necessary drive torque is increased at the time of starting, acceleration with high speed, travelling on an uphill road and traction etc. to increase the tractive forces of tires, the travelling of a vehicle is smoothed.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
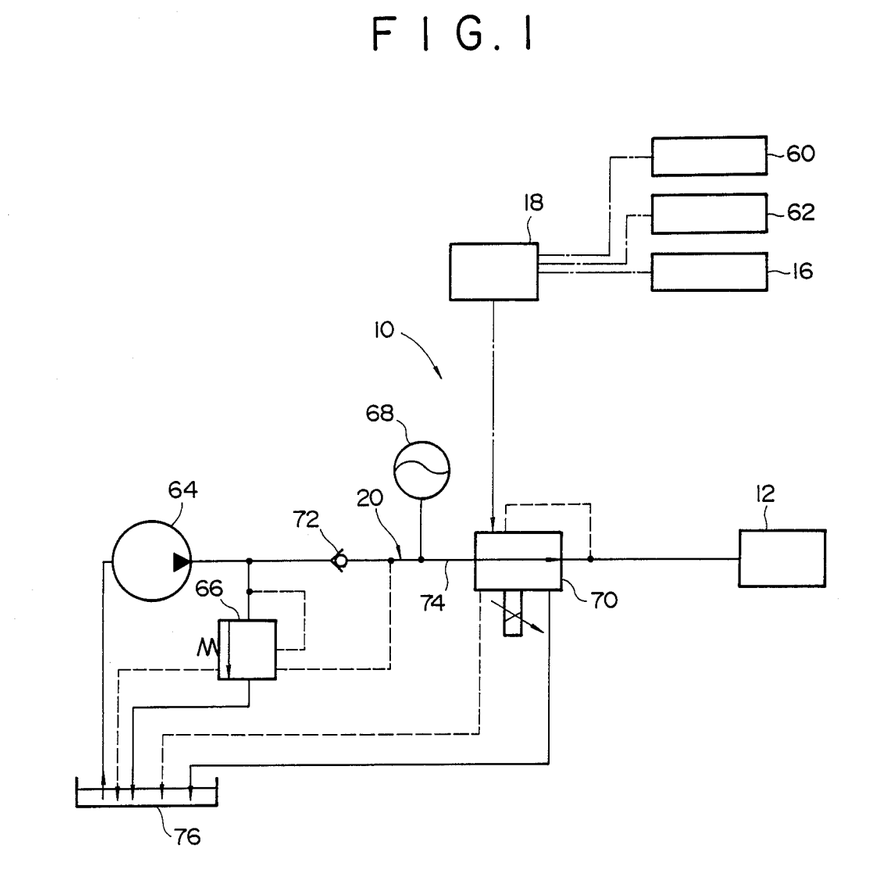
FIG. 1 is a block diagram showing a differential control device.
Figure 3:
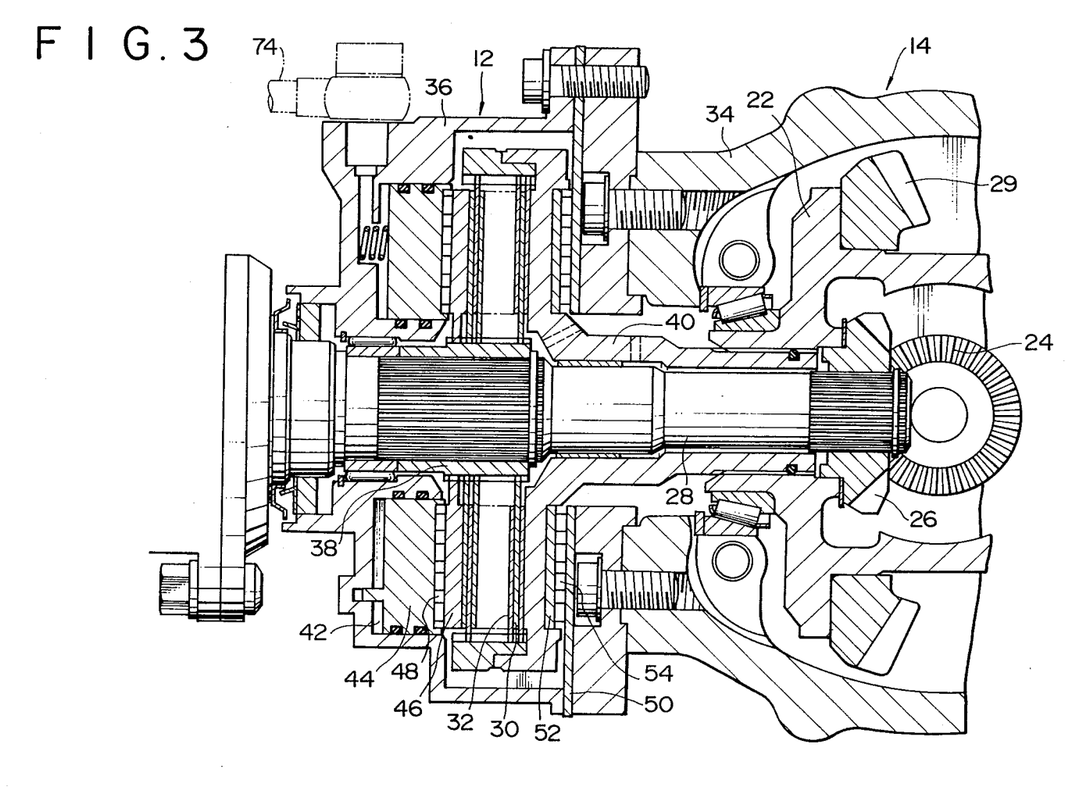
FIG. 3 is a sectional view showing a differential gear.

As shown in FIGS. 1 and 3, a differential control device 10 limits the differential of a differential gear 14 having a limited slip differential 12 and comprises means 16 for detecting drive torque, a controller 18 and operating means 20.

Any differential gear may be used so long as it is provided with the limited slip differential. The differential gear 14 shown in FIG. 3 is constituted from a differential case 22, a plurality of pinions 24 and a pair of side gears 26 (each one of them is shown in the drawing) respectively disposed in the differential case 22 and the shafts 28 connected to respective side gears 26. A drive pinion (not shown) meshes with a ring gear 29 to transmit drive force.

The limited slip differential 12 limits the differential of the differential gear 14 and is provided with a plurality of first friction disks 30 rotatable with one side gear 26 and a plurality of second friction disks 32 rotatable with the differential case 22. A first differential carrier 34 is fixedly disposed to surround and support rotatably the differential case 22. A second differential carrier 36 is fixed to the first differential carrier 34.

A cylindrical spacer 38 is mounted unrotatably on the shaft 28 through splines. The first friction disks 30 are supported on the spacer 38 through splines unrotatably but axially movably of the shaft 28. On the other hand, a transmitting member 40 unrotatably connected with the differential case 22 through splines is disposed to surround the shaft 28. The transmitting member 40 is provided with a portion having a diameter which is expanded at a position beyond the first differential carrier 34. The second friction disks 32 are supported on the expanded diameter portion through splines unrotatably but axially moveable. The first and second friction disks 30,32 are disposed alternatively. The second differential carrier 36 surrounds the expanded diameter portion of the transmitting member 40.

The differential carrier 36 is provided with a piston chamber 42 in which a first piston 44 is disposed slidably but unrotatably. A second piston 46 is disposed spacedly from the first piston 44 and supported on the spacer 38 through splines unrotatably but axially moveable. A thrust bearing 48 is disposed between the first and second pistons 44,46.

When liquid pressure is introduced from the outside into the piston chamber 42, the first piston 44 is pressed against the second piston 46 through the thrust bearing 48 to produce frictional force in proportion to the press force between the first and second friction disks 30,32. The differential of the differential gear 14 is limited by this frictional force. At this time, the reaction generated in the transmitting member 40 is transmitted to a thrust washer 50 disposed between the differential carriers 34,36, a thrust washer 52 disposed on the transmitting member 40 and thrust bearing 54 disposed between both washers. The differential carrier 34 receives the reaction thus transmitted.

The means 16 for detecting torque is a wheel torque meter or other torque detectors to detect the drive torque of a drive shaft or propeller shaft at the neighborhood of a driving wheel.

The controller 18 is a CPU or computer for :(a); receiving signals from the torque detecting means 16 to judge the size of torque, (b); determining whether or not the differential should be limited or the limitation of the differential should be released; and then controlling as will be later described. In an embodiment shown in FIGS. 1 and 2, signals from a steering angle sensor 60 and a vehicle speed sensor 62 are sent to the input of the controller 18.

The operating means 20 shown in the embodiment of FIG. 1 is provided with a liquid pump 64, an unloading relief valve 66, an accumulator 68, a current control pressurereducing valve 70 and a check valve 72.

A pipe 74 is connected to the pump 64 and the second differential carrier 36 of the limited slip differential 12 to communicate to the piston chamber 42. The unloading relief valve 66 is incorporated in the pipe 74 and the current control pressure-reducing valve 70 is incorporated in a portion of the pipe leading from the unloading relief valve 66 to the limited slip differential 12. Further, the accumulator 68 is connected between the unloading relief valve 66 and the current control pressure-reducing valve 70. The check valve 72 is incorporated between the unloading relief valve 66 and the accumulator 68. The check valve 72 allows liquid or pressure to be respectively sent or transmitted only from the unloading relief valve 66 to the accumulator 68.

When pressurized liquid is supplied from the pump 64, an unloading seat of the unloading relief valve 66 is closed and the check valve 72 is opened. As a result, the pressurized liquid is introduced from the pump 64 through the pipe 74 into the accumulator 68 to increase liquid pressure therein. When the pressure in the accumulator 68 reaches pressure adjusted by the unloading relief valve 66, the unloading relief valve 66 is instantly opened to return pressurized liquid from the pump 64 to a reservoir tank 76 and the check valve 72 is closed. Thus, constant pressure is accumulated in the accumulator 68.

The current control pressure-reducing valve 70 has a pilot section provided with a DC solenoid. Output pressure therefrom is controlled continuously and nonsteplessly by controlling input current to the solenoid. The controlled pressure in this case is substantially proportional to the input current. Then, proper pressure may be obtained by controlling input current given to the current control pressure-reducing valve 70 by the controller 18.

Figure 2:
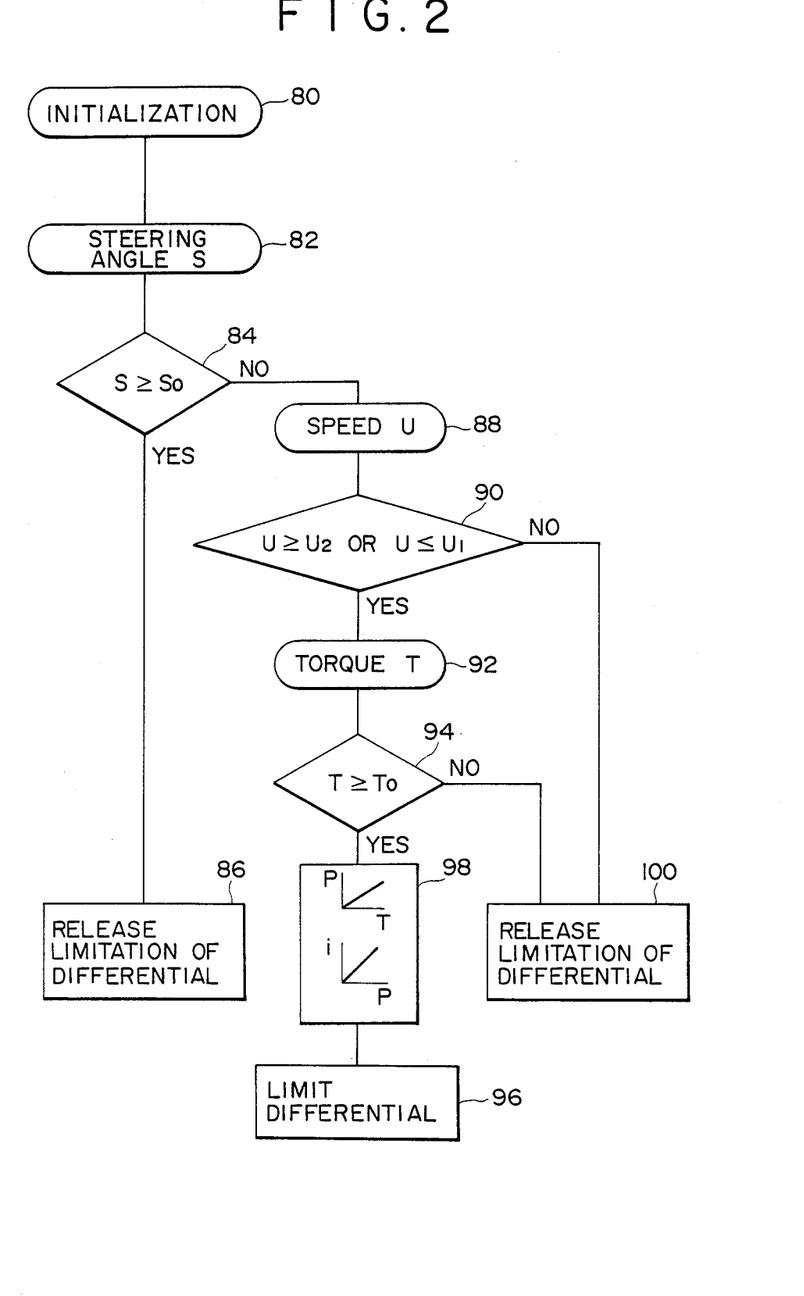
FIG. 2 is a flow chart showing the control of the differential.

The controller 18 judges as shown in FIG. 2, for example, to control the operating means 20. After initialization (80), a steering angle S is detected (82) by the steering angle sensor 60 and compared (84) with a set value So. When the steering angle is not smaller than the set value, the limitation of the differential of the differential gear 14 is released (86). Namely, any differential will be produced and turning will be done without any trouble.

When the steering angle S is smaller than the set value So, a vehicle travels straight or approximately straight forward. Then, vehicle speed U is detected (88) by the speed sensor 62 and compared (90) with the set values $U_1$, $U_2$ ($U_2 > U_1$). When the vehicle speed U is not lower than the set value $U_2$, the vehicle is travelling with high speed. When the vehicle speed U is not higher than the set value $U_1$, the vehicle is travelling with low speed such as starting, travelling on an uphill road and traction. When the vehicle speed U is not lower than the set value $U_2$ or not higher than the set value $U_1$, the torque T is detected (92) by the torque detecting means 16 and compared (94) with a predetermined value $T_0$. When the torque T is not smaller than the predetermined value $T_0$, the differential is limited (96). In this case, the predetermined value $T_0$ is set to zero or above.

In the embodiment, the current control pressure reducing valve 70 supplies pressure in proportion to current to the limited slip differential 12. Thus, the differential may be limited in proportion to the size of the torque T. The relationship between the torque T and the pressure P to be given to the liquid chamber 42 and the relationship between the pressure P and the current i are stored as respective maps in the controller 18 to limit the differential by utilizing these relationships. The controller 18 obtains (98) the pressure P according to the torque T and the current i according to the pressure P from the maps. The current i is then supplied to the current control pressure-reducing valve 70. Thus, the pressure P is supplied to the limited slip differential 12, so that the first piston 44 presses the second piston 46 within the force in proportion to the pressure. Therefore, the first and second friction disks 30,32 contact each other to generate the frictional force in proportion to the pressure and limit the differential of the differential gear 14.

When the vehicle speed U is over the set values $U_1$ up to $U_2$, or when the torque T is smaller than the predetermined value $T_0$ even if the vehicle speed U is not lower than the set value $U_2$ or not higher than the set value $U_1$, the limitation of the differential is released (100).

While the drive torque is detected directly according to the embodiment noted above, hereinafter will be described other embodiments in which a drive torque condition is detected to obtain torque with the controller 18 on the basis of the detected torque condition. The obtained torque may be compared with a predetermined value for controlling the operating means 20. In the following embodiment, however, since the operating means 20 is provided with the current control pressure-reducing valve 70 which controls the output pressure continuously according to the obtained torque, the operating means 20 is controlled without comparing the obtained torque with the predetermined value.

Figure 4:
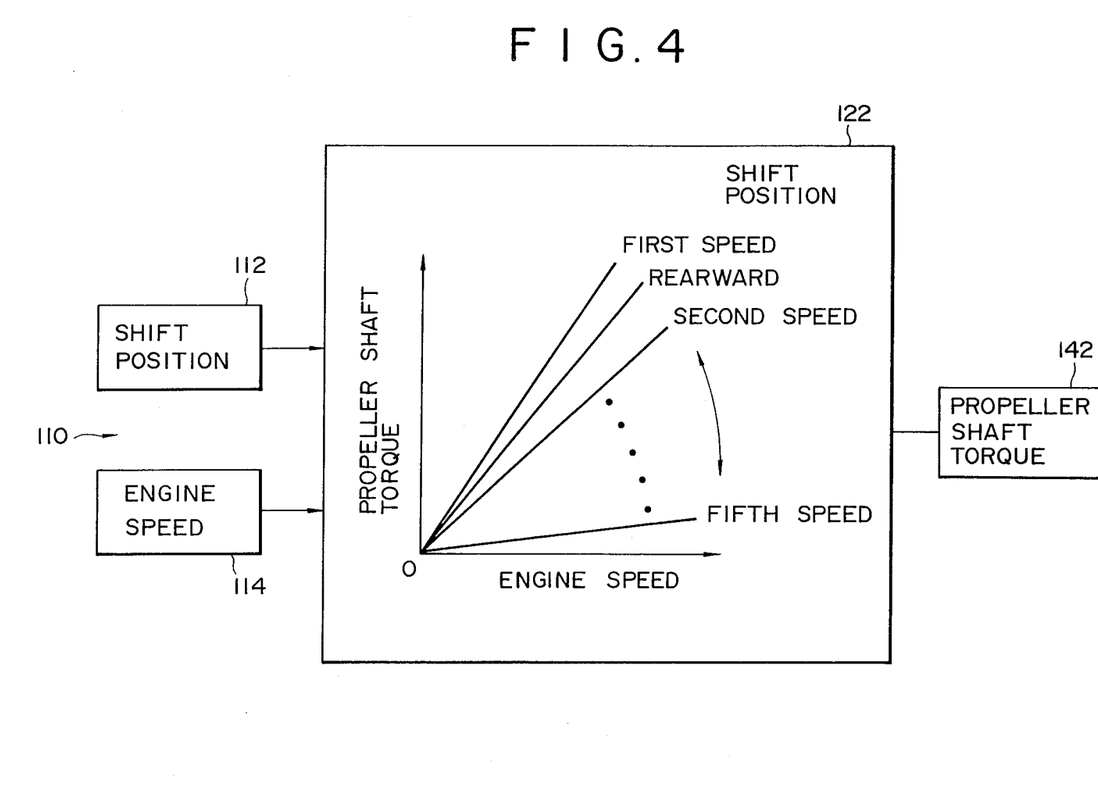
FIG. 4 is a flow chart showing another embodiment of control.

In the embodiment shown in FIG. 4, means 110 for detecting the drive torque condition includes a sensor 112 for detecting a shift position of a transmission and a sensor 114 for detecting an engine speed.

Figure 5:
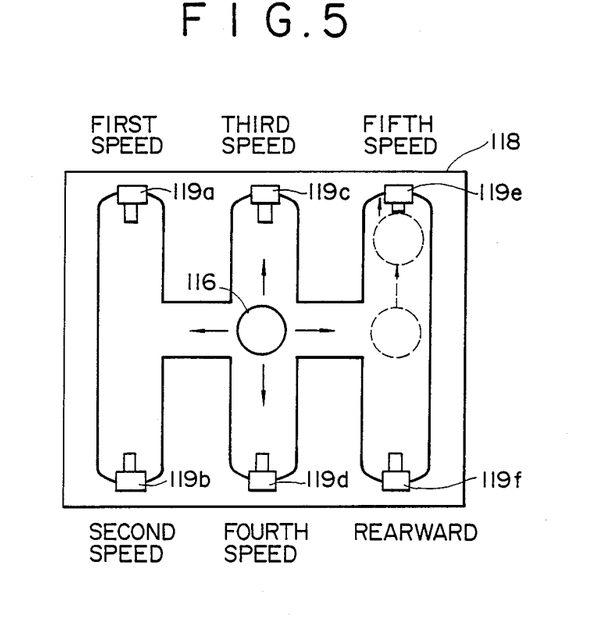
FIGS. 5 and 6 are plan views showing sensors for detecting shift position.

The shift position detecting sensor 112 in a manual operation, as shown in FIG. 5, is constituted from a detecting plate 18 having switches 119a,119b ... 119f disposed respectively at the shift positions occupied by a shift lever 116 in the first speed to fifth speed and reverse drive. Each switch may be a limit switch, a proximity switch or other switches. When the shift lever 116 is shifted, the switch in the corresponding shift position is turned on.

Figure 6:
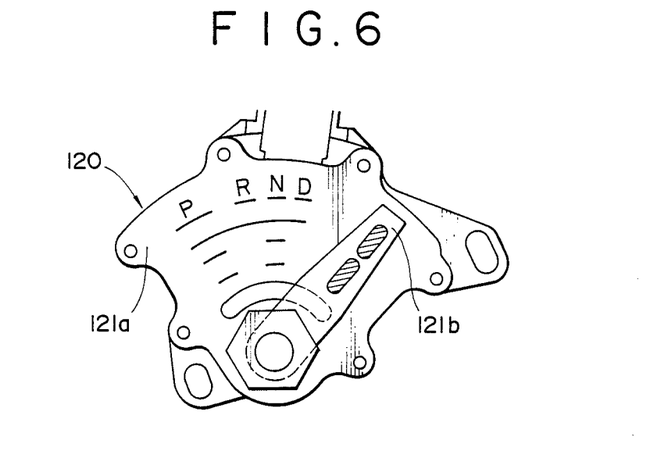

The shift position sensor 112 is an automatic operation is constituted from solenoid valves and a neutral start switch 120 shown in FIG. 6. That is, a plurality of solenoid valves $S_1$, $S_2$, $S_3$ are used to shift gears of a transmission, and the relationship shown on the following table, for example, is established between their operational conditions and the shift positions of the gears;

| Solenoid valve | | $S_1$ | $S_2$ | $S_3$ |
|---|---|---|---|---|
| Reverse | | * | | |
| Neutral | | * | | |
| Forward drive | First speed | * | | |
| | Second speed | * | * | * |
| | Third speed | | * | * |
| | Over drive | | | * |

On the other hand, the neutral start switch 120 includes a printed circuit substrate 121a and a change-over lever 121b. According to the position of the change-over lever 121b are detected parking P, reverse R, neutral N, forward drive D and so on. Then, the shift position may be known by the combination of the signals of solenoid valves and neutral start switch 120.

The controller 18 is provided with maps 122 each storing the correlation between the engine speed and torque of a propeller shaft (the correlations are shown only in one map for convenience in FIG. 4) in every shift position. When the signal from the shift position sensor 112 is sent to the input of the controller 18, the map corresponding to the shift position is first selected, and thereafter the torque of the propeller shaft is obtained by the signal from the engine speed sensor 114. The operating means 20 operates the limited slip differential 12 by controlling current corresponding to the obtained torque.

Figure 7:
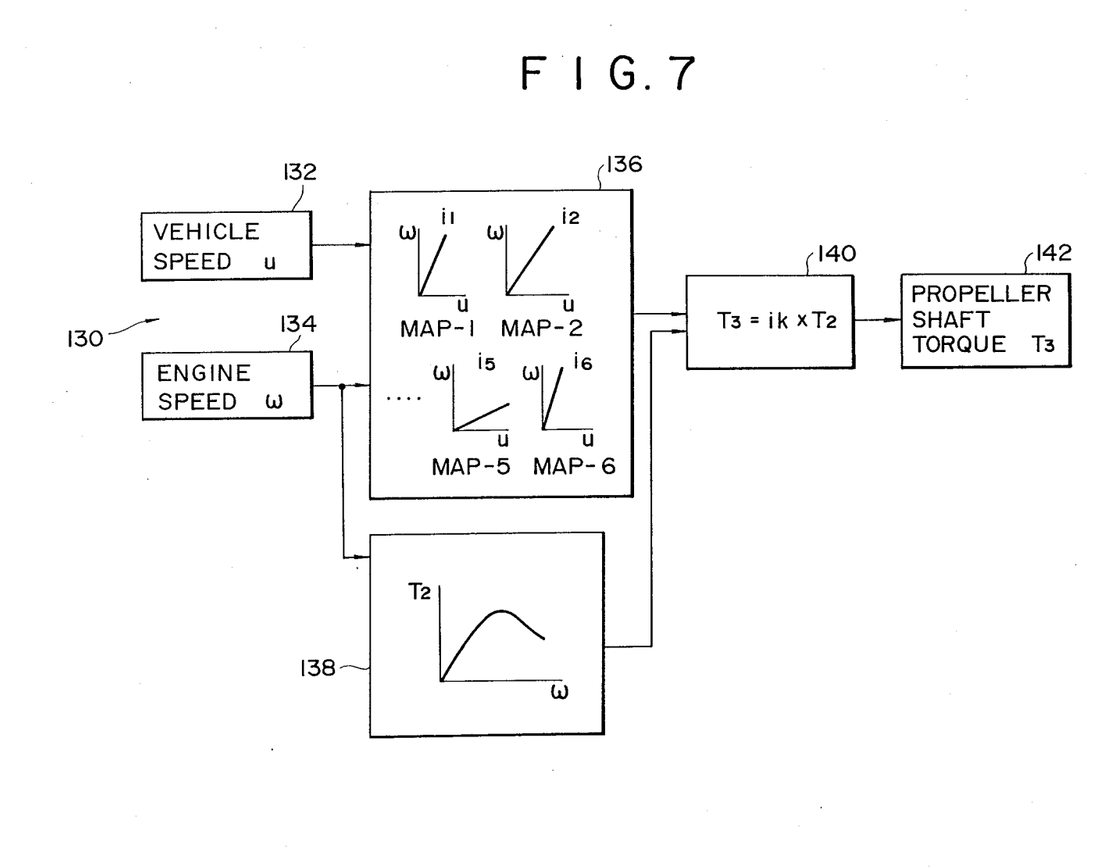
FIGS. 7 and 8 are flow charts showing further embodiments of control.

In the embodiment shown in FIG. 7, means 130 for detecting a drive torque condition includes a vehicle speed sensor 132 and an engine speed sensor 134. On the basis of signals from these sensors, the controller 18 obtains the torque as follows;

On respective maps 136 in the controller 18 are previously stored the reduction gear ratios of transmission in the first to fifth speed and reverse drive in correlation with the vehicle speed U and engine speed $\omega$ at evey gear reduction ratio (the correlations are shown only in one map in FIG. 7 for convenience). On the other hand, the correlation between the engine speed $\omega$ and the engine torque $T_2$ is stored in a map 138.

When the vehicle speed U and engine speed $\omega$ are sent to the input of the controller 18, the controller 18 obtains the reduction ratio $i_k$ corresponding to both signals from the maps 136 and obtains the engine torque $T_2$ from the map 138 on the basis of the engine speed. Thereafter, the product of reduction ratio $k_i$ and engine torque $T_2$ is calculated (140) to obtain the torque $T_3$ of the propeller shaft (142). The operating means 20 is operated to give the frictional force corresponding to the torque $T_3$ to the limited slip differential 12.

Figure 8:
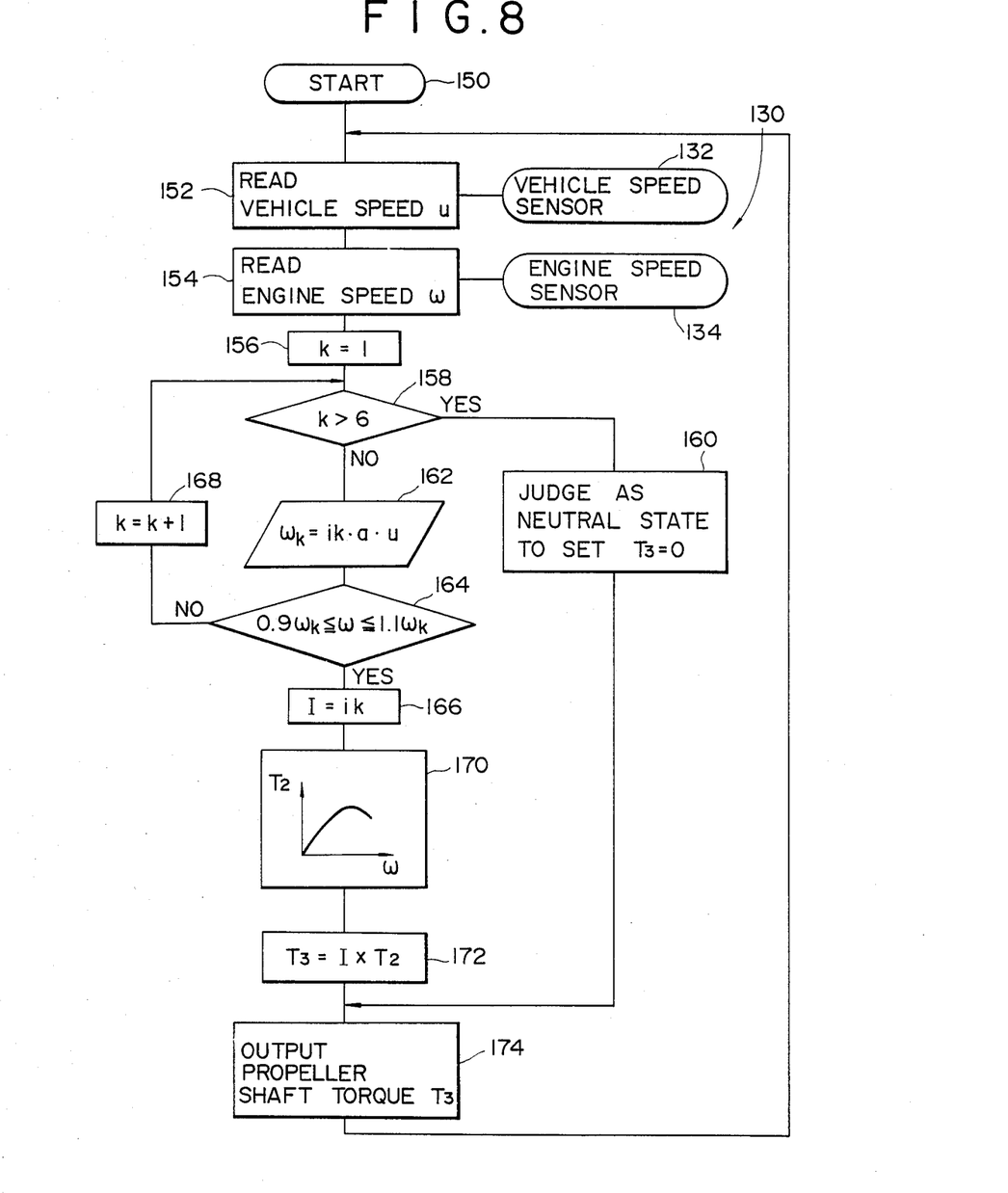

In the embodiment shown in FIG. 8, the controller 18 calculatively obtains the reduction ratio on the basis of signals of the vehicle speed sensor 132 and engine speed sensor 134. Namely, initialization is carried out (150), the vehicle speed U is read (152) and the engine speed $\omega$ is read (154). Assuming (156) k=1, this value of k is compared (158) with 6. In this case, the comparison of k with 6 is based on the assumption that the transmission has five forward stages and one rearward stage.

When the value k is larger than 6, the torque $T_3$ is set (160) to zero. When the value k is not larger than 6, presumed engine speed $\omega_k$ is obtained (162) from the product of the reduction ratio $i_k$ in the k-th speed (the reduction ratios from k=1 to k=5 are previously stored in the controller 18), a constant a determined by the final reduction ratio of the differential gear and the diameter of a tire etc. and the vehicle speed U to compare (164) the detected engine speed $\omega$ with the calculated engine speed $\omega_k$. When the detected engine speed falls within 10% of the presumed engine speed $\omega_k$, for example, the reduction ratio I is set (166) to $i_k$. On the other hand, when the detected engine speed $\omega$ is outside said range, k is (168) set to (k+1) and k thus set is compared (158) with 6.

In the controller 18 is previously stored (170) the correlation between the engine speed $\omega$ and the engine torque $T_2$ to obtain the engine torque $T_2$ from the detected engine speed $\omega$. The torque $T_3$ of the propeller shaft which is to be given to the limited slip differential 12 by the operating means 20 is calculated (172) from the reduction ratio I and engine torque $T_2$ and outputted (174).

What is claimed is:

1. A differential control device for controlling the differential of a differential gear having a limited slip differential, comprising:
    detecting means for detecting drive torque;
    a controller for receiving the detected torque from said detecting means and comparing the size of the detected torque with a predetermined value; and
    operating means controlled by said controller to operate said limited slip differential for limiting the differential when the detected torque exceeds the predetermined value,
    wherein said controller determines running conditions of a vehicle, compares the size of the detected torque with the predetermined value when certain running conditions have been determined, and then controls the operating means to limit the differential when the detected torque exceeds the predetermined value.

2. A differential control device as claimed in claim 1, further comprising steering angle detecting means, and wherein the controller handles the detected steering angle in preference to the drive torque and releases the limitation of the differential when the detected steering angle exceeds a predetermined value.

3. A differential control device as claimed in claim 1, further comprising a vehicle speed sensor from which running conditions can be determined, and wherein the controller handles the drive torque when the vehicle speed detected by the sensor is equal to or larger than a predetermined first value, or equal to or smaller than a predetermined second value which is smaller than the first value.

4. A differential control device as claimed in claim 1, wherein said operating means is capable of supplying pressures in proportion to torques to the limited slip differential, and wherein the controller controls said limited slip differential through said operating means to limit the differential continuously.

5. A differential control device for controlling the differential of a differential gear having a limited slip differential, comprising:
   detecting means for detecting drive torque;
   a controller for receiving the detected torque from said detecting means; and
   operating means controlled by said controller to operate said limited slip differential, the operating means being capable of supplying pressures in proportion to torques to the limited slip differential,
   wherein said controller determines running conditions of a vehicle, compares the size of the detected torque with a predetermined value when certain running conditions have been determined, and then controls said limited slip differential through said operating means to limit the differential continuously when the detected torque exceeds the predetermined value.

6. A differential control device for controlling the differential of a differential gear having a limited slip differential, comprising:
   detecting means for detecting a drive torque condition;
   a controller for obtaining torques on a basis of signals from said detecting means; and
   operating means controlled by said controller to operate said limited slip differential,
   wherein said controller determines running conditions of a vehicle, compares the size of the obtained torque with a predetermined value when certain running conditions have been determined, and then controls the operating means to limit the differential when the obtained torque exceeds the predetermined value.

7. A differential control device as claimed in claim 6, wherein said drive torque condition detecting means includes a sensor for detecting a shift position of a transmission and a sensor for detecting an engine speed, and wherein a map for obtaining torques from shift positions and engine speeds is stored in the controller.

8. A differential control device as claimed in claim 7, wherein said shift position detecting sensor includes a detecting plate having switches disposed respectively at the shift positions occupied by a shift lever.

9. A differential control device as claimed in claim 8, wherein said controller obtains torque of a propeller shaft from the detected engine speed in every shift position of the transmission, and the limited slip differential is controlled by the torque of the propeller shaft.

10. A differential control device as claimed in claim 7, wherein said shift position detecting sensor includes solenoid valves and a neutral start switch.

11. A differential control device as claimed in claim 6, wherein the drive torque condition detecting means includes a vehicle speed sensor and an engine speed sensor, and wherein maps for obtaining torques from vehicle speeds and engine speeds are stored in the controller.

12. A differential control device as claimed in claim 11, wherein said controller obtains a reduction ratio from the detected vehicle speed and detected engine speed and an engine torque from the detected engine speed, and further obtains torque of a propeller shaft by the product of the reduction ratio and the engine torque, and wherein said limited slip differential is controlled by the torque of the propeller shaft.

13. A differential control device for controlling the differential of a differential gear having a limited slip differential, comprising:
   detecting means for detecting a drive torque condition;
   a controller for obtaining torques on a basis of signals from said detecting means; and
   operating means controlled by said controller to operate said limited slip differential, the operating means supplying pressures in proportion to torques to the limited slip differential,
   wherein said controller determines running conditions of a vehicle, compares the size of the obtained torque with a predetermined value when certain running conditions have been determined, and then controls said limited slip differential through the operating means to limit the differential continuously when the obtained torques exceeds the predetermined value.

14. A differential control device for controlling the differential of a differential gear having a limited slip differential, comprising:
   detecting means for detecting a drive torque condition, said detecting means including a vehicle speed sensor and an engine speed sensor;
   a controller for obtaining torques on a basis of signals from said detecting means to compare a size of the obtained torque with a predetermined value; and
   means controlled by said controller to operate said limited slip differential for limiting the differential when the obtained torque exceeds the predetermined value;
   wherein said controller obtains a reduction ratio from the detected vehicle speed and detected engine speed and an engine torque from the detected engine speed, and further obtains torque of a propeller shaft by the product of the reduction ratio and the engine torque, and wherein said limited slip differential is controlled by the torque of the propeller shaft.

* * * * *